April 15, 1969 J. M. EUBANKS 3,439,286
PULSE AMPLIFIER
Filed July 29, 1965
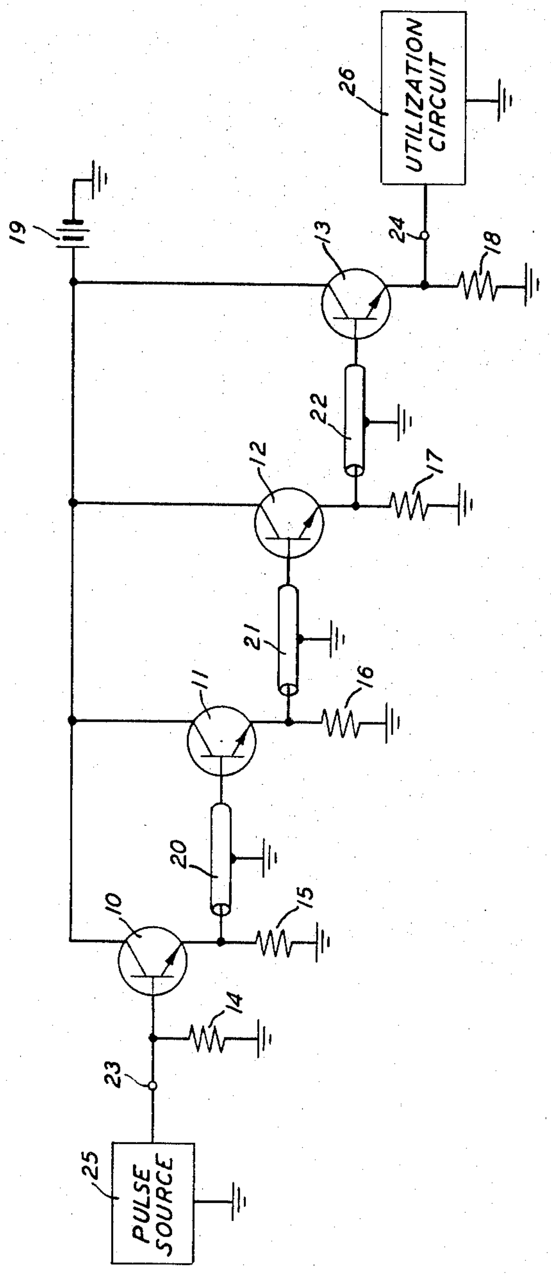
INVENTOR
J. M. EUBANKS
BY
ATTORNEY United States Patent Office 3,439,286

Patented Apr. 15, 1969

3,439,286
PULSE AMPLIFIER

John M. Eubanks, Greensboro, N.C., assignor to Bell Telephone Laboratories, Incorporated, New York, N.Y., a corporation of New York Filed July 29, 1965, Ser. No. 475,765
Int. Cl. H03f 3/60, 3/42
U.S. Cl. 330—21 12 Claims

ABSTRACT OF THE DISCLOSURE

A cascade connected multi-stage pulse amplifier, each stage of which includes a first and second transistor. The successive stages are interconnected by respective transmission line sections. The length of the transmission line section is such that the propagation time therethrough is greater than one-half of the duration of the pulses to be amplified.

This invention relates to pulse amplifiers and in particular to amplifiers capable of amplifying narrow pulses. Embodiments of the invention have been found particularly useful in amplifying pulses of 10 or less nanoseconds' duration.

Some of the present trends in the electronic art are resulting in the use of pulses having durations in the order of 10 or less nanoseconds. Although it often occurs that these pulses must be amplified, such amplification has been difficult to achieve. Transistor amplifiers of the common emitter and common base configurations, for example, have bandwidth limitations which result in decreasing voltage gains as the durations of the pulses are decreased. The remaining or common collector configuration (which is found in emitter followers) has a better bandwidth characteristic, but unfortunately does not provide a voltage gain.

It is an object of the present invention to voltage amplify narrow pulses.

The invention in one of its broader aspects takes the form of a plurality of emitter followers serially connected by sections of a transmission line. The emitter followers, which are normally biased nonconducting, have output impedances substantially equal to the characteristic impedance of the transmission line. Because of this and the fact that the input impedance of an emitter follower is greater than that of its output, the impedances terminating the output ends of the sections of transmission line are greater than the characteristic impedance of the line. The impedance mismatches thus produced cause incident pulses to be reflected in such a way that the voltage amplitudes of the pulses applied to the emitter followers are greater than those of the incident pulses. This action results in the combination producing a voltage gain.

Further reflections of the reflected pulses within the sections of transmission line are substantially prevented by the reasonably good impedance matches between the sections and their preceding emitter followers when the reflected pulses arrive back at the preceding emitter followers.

In addition to the impedance transformation and reasonably good transmission bandwidth characteristics of the emitter followers as mentioned above, the emitter followers provide several other characteristics that contribute to the successful operation of the invention. Firstly, the pulse reproductability of the emitter followers is excellent because of the inherent voltage feedback characteristic of these circuits. Secondly, the emitter followers produce a current gain which both compensates for losses in the circuit and increases the output power level of the amplifier. Furthermore, the common collector aspect of the emitter follower circuits make it possible to operate the collectors of the transistors in these circuits at relatively high potentials, which provides a high gain-bandwidth product for the transistors.

Other objects and features of the invention will become apparent from the following detailed description of a specific embodiment which is illustrated in schematic form in the drawing.

The disclosed embodiment of the invention includes four emitter followers. The emitter followers comprise transistors 10 through 13, resistors 14 through 18, and a direct potential source 19. (The transistors are of the NPN type although those of the PNP type may be used by reversing all polarities as appreciated by those skilled in the art.) The positive terminal of source 19 is connected to the collector electrode of each of transistors 10 through 13 while its negative terminal is connected to a point of ground potential. Resistor 14 is connected between the base electrode of transistor 10 and a point of ground potential while resistors 15 through 18 are connected between points of ground potential and the emitter electrodes of transistors 10 through 13, respectively.

Three sections of transmission line 20 through 22 serially connect the emitter followers of the disclosed embodiment to form a cascade configuration of alternately occurring emitter followers and sections of transmission line. In particular, transmission line section 20 is connected between the output of the emitter follower comprising transistor 10 and the input of the emitter follower comprising transistor 11. In a similar manner, transmission line section 21 is connected between the emitter followers comprising transistors 11 and 12, while transmission line section 22 is connected between the emitter followers comprising transistors 12 and 13.

Transmission line sections 20 through 22 may take the form of either distributed parameter or lumped parameter lines, They may comprise, for example, coaxial cables, open lines, printed circuits or networks of individual components having values and interconnections to simulate transmission line sections. Such networks are known to those skilled in the art.

The input to the disclosed cascade arrangement is applied between a point of ground potential and an input terminal 23 connected to the base electrode of transistor 10. The output is obtained between a point of ground potential and an output terminal 24 connected to the ungrounded extremities of resistor 18.

The illustrative embodiment disclosed amplifies positive going pulses. In the drawing, the pulses are supplied by a pulse source 25 connected between a point of ground potential and input terminal 23. The output pulses are also positive going and are shown in the drawing as being applied to a utilization circuit 26 connected between a point of ground potential and output terminal 24.

In accordance with the present invention, transistors 10 through 13 are normally in substantially nonconducting states. Furthermore, the resistive values of resistors 15 through 18 and the characteristic impedances of the transmission line sections connected to them are all substantially equal to one another. Still further, the propagation time through each of the sections is greater than one-half of the duration of the pulses to be amplified. The reasons for these conditions will become apparent from the following detailed description of the operation of the embodiment.

A positive going pulse from source 25 causes transistor 10 to conduct and a pulse of slightly less voltage amplitude to be developed across resistor 15. The pulse developed across resistor 15 propagates down transmission line section 20. Because the resistance value of resistor 16 is substantially equal to the characteristic impedance of section 20 and, furthermore, because an emitter follower has an impedance transformation characteristic which makes its input impedance appear greater than its output impedance, line section 20 is terminated in an impedance which has a value in excess of that of the section. This impedance mismatch causes the pulse propagating down the line section to be reflected in such a manner that the voltage amplitude of the pulse applied to the emitter follower including transistor 11 is greater than that of the pulse originally propagated down the section. Ideally, the voltage amplitude of the pulse applied to the succeeding emitter follower is twice that of the incident pulse. Because of losses, however, a voltage gain of two is not achieved in practice. A voltage gain of approximately one and one-half has been realized between the input of one of the emitter followers and the input of the succeeding emitter follower.

When the reflected pulse arrives at the input end of line section 20, the driving pulse from source 25 has ceased. This is because the round trip propagation time of line section 20 is greater than the input pulse duration. Because the resistance value of resistor 15 is substantially equal to the characteristic impedance of line section 20, further reflection of the reflected pulse is substantially prevented.

This same action is repeated in the remaining subcombinations of emitter followers and transmission line sections.

The total gain that has been relaized in practice may be expressed in approximate form by the following equation:

$$\text{Voltage gain}=(1.5)^{n-1}$$

where $n$=the number of emitter followers and
$n-1$=the number of transmission line sections.

The disclosed embodiment provides a voltage gain of approximately 3.4.

The invention features several other advantages as discussed in the following three paragraphs.

As appreciated by those skilled in the art, a voltage gain produced as a result of an impedance mismatch results in a current loss. In particular, an impedance mismatch does not increase the energy content of the signal so a voltage gain must be accompanied by a compensating current loss. In accordance with the invention, this current loss and other losses are more than compensated by the current gains provided by the emitter followers.

The shape of the output pulse appearing at terminal 24 is relatively similar to that of the input pulse at terminal 23. This occurs as a result of the negative feedback characteristics of the emitter followers. Pulse shaping of the output pulses is therefore frequency unnecessary.

As mentioned previously, the common collector aspect of the emitter followers makes it possible to use a source 19 which has a higher potential than can be used with the same transistors in either the common base or common emitter configurations. Because a higher potential source can be used, the present invention permits the transistors to be operated in a manner to provide a relatively high gain-bandwidth product.

Although only one embodiment of the invention has been disclosed and described in detail, it is to be understood that other embodiments may be produced by those skilled in the art without departing from the spirit and scope of the invention.

What is claimed is:

1. A pulse amplifier comprising:
a plurality of emitter followers,
a plurality of transmission line sections interconnecting said emitter followers to form a cascade configuration of alternately occurring emitter followers and transmission line sections,
said emitter followers being biased so as to be normally nonconducting and having output impedances when in their nonconducting states substantially equal to the characteristic impedances of said transmission line sections connected to their outputs, respectively,
each of said transmission line sections having a propagation time greater than one-half of the duration of the pulses to be amplified,
means for applying at least one pulse to the first emitter follower in said cascade configuration which pulse as it traverses said configuration is reflected, as a result of impedance mismatches, when it arrives at the junctions between said transmission line sections and their immediately succeeding emitter followers and, furthermore, is substantially absorbed, as a result of substantial impedance matches, when it arrives in its reflected form at the junctions between said transmission line sections and their immediately preceding emitter followers, and
a pair of output terminals connected to the last emitter follower in said cascade configuration.

2. An amplifier in accordance with claim 1 in which each of said transmission line sections comprises a distributed parameter transmission line section having a length sufficiently long to provide said propagation time.

3. An amplifier in accordance with claim 1 in which each of said transmission line section comprises a network of components interconnected to simulate a section of transmission line.

4. A pulse amplifier comprising:
two emitter followers,
a transmission line section interconnecting said emitter followers to form a cascade arrangement,
said emitter followers being biased so as to be normally nonconducting and having output impedances when in their nonconducting states substantially equal to the characteristic impedance of said transmission line section,
said transmission line section having a propagation time greater than one-half of the duration of the pulses to be amplified,
means for applying at least one pulse to the first emitter follower in said cascade arrangement which pulse as it traverses said arrangement is reflected, as a result of an impedance mismatch, when it arrives at the junction between said transmission line section and its immediately succeeding emitter follower and, furthermore, is substantially absorbed, as a result of a substantial impedance match, when it arrives in its reflected form at the junction between said transmission line section and its immediately preceding emitter follower, and
a pair of output terminals connected to the last emitter follower in said cascade arrangement.

5. An amplifier in accordance with claim 4 in which each of said transmission line sections comprises a distributed parameter transmission line section having a length sufficiently long to provide said propagation time.

6. An amplifier in accordance with claim 4 in which each of said transmission line sections comprises a network of components interconnected to simulate a section of transmission line.

7. A pulse amplifier comprising:
a source of direct potential where said source has a pair of terminals,
$n$ stages where each stage comprises a transistor, a resistor having one extremity connected to the emitter electrode of said transistor, means connecting the other extremity of said resistor to one of said source terminals and means connecting the collector electrode of said transistor to the other of said source terminals,
$n-1$ transmission line sections coupling said stages to form a cascade arrangement of alternately occurring stages and transmission line sections where the input leads of said sections are connected to said resistor extremities, respectively, and the output leads of said sections are connected to the base electrodes and said other extremities of said resistors, respectively, said resistors having resistance values substantially equal to the characteristic impedances of said transmission line sections and said transmission line sections having propagation times greater than one-half of the duration of the pulses to be amplified, means for applying at least one pulse to the first stage in said cascade arrangement which pulse as it traverses said arrangement is reflected, as a result of impedance mismatches, when it arrives at the junctions between said transmission line sections and their immediately succeeding stages and, furthermore, is substantially absorbed, as a result of substantial impedance matches, when it arrives in its reflected form at the junctions between said transmission line sections and their immediately preceding stages, and a pair of output terminals connected to the last stage of said cascade arrangement.

8. An amplifier in accordance with claim 7 in which each of said transmission line sections comprises a distributed parameter transmission line section having a length sufficiently long to provide said propagation time.

9. An amplifier in accordance with claim 7 in which each of said transmission line sections comprises a network of components interconnected to simulate a section of transmission line.

10. A pulse amplifier comprising:

a pair of terminals to which a direct potential source may be connected,

*n* stages where each stage comprises a transistor having a collector electrode connected to a first of said terminals and a resistor connected between the other of said terminals and the emitter electrode of said transistor, $n-1$ transmission line sections coupling said stages to form a cascade arrangement of alternately occurring stages and transmission line sections where an input lead of each of said sections is connected to one of said emitter electrodes, an output lead of each of said sections is connected to one of said base electrodes and the remaining input and output leads of said sections are connected to said other terminal, said resistors having resistance values substantially equal to the characteristic impedances of said transmission line sections and said transmission line sections having propagation times greater than one-half of the duration of the pulses to be amplified, means for applying at least one pulse to the first stage in said cascade arrangement which pulse as it traverses said arrangement is reflected as a result of impedance mismatches, when it arrives at the junctions between said transmission line sections and their immediately succeeding stages and, furthermore, is substantially absorbed as a result of substantial impedance matches, when it arrives in its reflected form at the junctions between said transmission line sections and their immediately preceding stages, and a pair of output terminals connected to the last stage of said cascade arrangement.

11. An amplifier in accordance with claim 10 in which each of said transmission line sections comprises a distributed parameter transmission line section having a length sufficiently long to provide said propagation time.

12. An amplifier in accordance with claim 10 in which each of said transmission line sections comprises a network of components interconnected to simulate a section of transmission line.

References Cited

UNITED STATES PATENTS

| | | | |
|---|---|---|---|
| 3,215,851 | 11/1965 | Warnock ---------- | 330—19 X |

FOREIGN PATENTS

| | | |
|---|---|---|
| 568,882 | 7/1958 | Belgium. |
| 1,180,803 | 11/1964 | Germany. |

ROY LAKE, *Primary Examiner.*

L. J. DAHL, *Assistant Examiner.*

U.S. Cl. X.R.

330—19

Disclaimer 3,439,286.—*John M. Eubanks*, Greensboro, N.C. PULSE AMPLIFIER. Patent dated Apr. 15, 1969. Disclaimer filed Sept. 28, 1971, by the assignee, *Bell Telephone Laboratories, Incorporated*.

Hereby enters this disclaimer to all claims of said patent.

[*Official Gazette January 4, 1972.*]